J. P. Miller,
Arithmetical Calculator.
Nº 39,740. Patented Sep. 1, 1863.
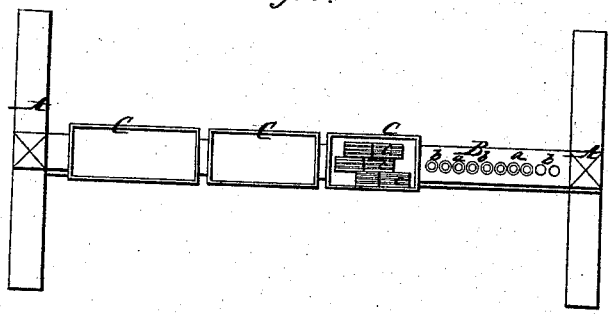
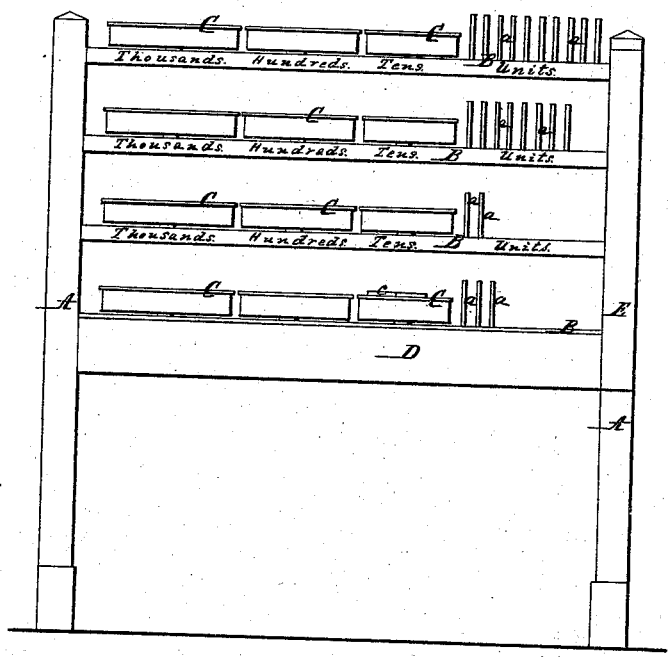
Witnesses:
Inventor:

UNITED STATES PATENT OFFICE.

JOHN P. MILLER, OF BOSTON, MASSACHUSETTS.

IMPROVEMENT IN ARITHMETICAL CALCULATORS.

Specification forming part of Letters Patent No. 39,740, dated September 1, 1863.

*To all whom it may concern:*

Be it known that I, JOHN P. MILLER of Boston, county of Suffolk, and State of Massachusetts, have invented an Improved Primary Arithmetical Calculator; and I do hereby declare that the following, taken in connection with the drawings which accompany and form part of this specification, is a description of my invention sufficient to enable those skilled in the art to practice it.

My invention consists in a peculiar arrangment or combination in a frame-work of bars, pegs, boxes, and slates for assistance in arithmetical instruction.

Figure 1 shows a plan of my apparatus; Fig. 2, a front elevation of the same.

A A denote two vertical posts, between and connecting which are a series of any suitable number of horizontal cross-bars, B. One end of each of these bars is perforated with ten holes, $b$, the holes of each bar being equidistant, and the series being so arranged that the holes of the lower bar are directly under the corresponding holes of the several bars above. These holes are for the purpose of receiving pegs $a$ $a$, made to fit uprightly therein, as seen in Fig. 2. Each bar has also a series of boxes, $c'$, arranged on top of the bar between the peg holes $b$, and the opposite end of the bar, the boxes being fastened permanently upon the bar, or made detachable therefrom at pleasure. The boxes nearest to the holes are designated, or may be considered to represent tens, the next boxes hundreds, and the last ones thousands, while the pegs $a$ denote units, the ends of each set vertically being the same vertical planes. A horizontal slate, D, is fixed to the lower bar, B, under the boxes $c'$ $c'$, and a vertical slate, E, is fixed to the post A, adjacent to the holes $a$.

The operation or manner of using the frame is as follows: The pegs when placed in the several peg holes represent "units"—as, for instance, the three pegs or units in the lower bar, two in the next above, eight in the next, and ten in the upper bar.

In instructing a child in the value and use of numbers, after teaching him by the successive insertion of pegs the meaning of the term "units," and value of the same, the teacher passes from units to "tens," and inserting ten of the pegs in one bar, he then collects them, and, tying them in a bundle, places it in the box designated by "tens," and instructs the child, that as ten pegs now in one bundle, it represents ten units, but only one ten, and by the slate he shows him how to designate the same by characters, and so when ten of such bundles are successively made by tying them together, he again marks one bundle, representing ten tens, but only one hundred, and as such he places the bundle in the box representing "hundreds." The successive bars may be used for instructing several scholars, while the slates at the sides and bottom may be used in connection with the boxes, bundles, and pegs, to instruct in the proper manner of representation of the inculcated ideas by characters or figures.

By means readily understood, and unnecessary to further illustrate, the different operations of "addition," "subtraction," "multiplication," and division of numbers may be elucidated and made very simple and clear by these means, keeping in the child's mind, by a tangible representation before him, the meaning and value of the terms employed and the different processes of construction in the several cardinal arithmetical rules.

In teaching the operation of addition, the pegs on each bar may be added up, and the result placed on the side slate, while those in each vertical line of boxes, and each series of holes vertically, may be again added up, and the result written on the lower slate, when by adding separately the sums on the vertical slate and then on the horizontal slate the results can be "proved." This frame so made I have found by long practice in teaching children to be very useful, and to serve by oral instruction, explanation, and practice combined to more tangibly to fix upon and inculcate in their minds different arithmetical constructions and operations than by any other explanatory instruments in use.

The frame may be made of any suitable size, either large enough to be used for instruction of a whole school or class, or small enough to be placed on a table, or held in the hand for teaching pupils singly.

What I claim is—

An instructing apparatus or frame made with registering and denoting bars and boxes in the manner and for the purpose substantially as herein set forth.

JOHN P. MILLER.

Witnesses:
J. B. CROSBY,
FRANCIS GOULD.